United States Patent [19]

Kato

[11] Patent Number: 5,523,922
[45] Date of Patent: Jun. 4, 1996

[54] ANALOG INDICATOR WITH SELF-LUMINESCENT POINTER

[75] Inventor: Miki Kato, Kariya, Japan

[73] Assignee: Nippondenso Co., Ltd., Kariya, Japan

[21] Appl. No.: 35,758

[22] Filed: Mar. 24, 1993

[30] Foreign Application Priority Data

Mar. 25, 1992 [JP] Japan .................................. 4-066987

[51] Int. Cl.$^6$ ................................................ G01D 11/28
[52] U.S. Cl. ............................ 362/23; 362/84; 362/294
[58] Field of Search ............................... 362/23, 26, 29, 362/30, 27, 28, 84, 294; 116/286, 288

[56] References Cited

U.S. PATENT DOCUMENTS

| | | | |
|---|---|---|---|
| 4,841,155 | 6/1989 | Ushida et al. | 362/84 |
| 4,991,537 | 2/1991 | Muramatsu | 362/84 |
| 5,050,045 | 9/1991 | Kato et al. | |
| 5,227,767 | 7/1993 | Tanaka | 362/27 |

FOREIGN PATENT DOCUMENTS

| | | | |
|---|---|---|---|
| 1240993 | 8/1960 | France | 362/26 |
| 1277718 | 11/1989 | Japan . | |
| 0077016 | 4/1991 | Japan | 362/23 |

*Primary Examiner*—Denise L. Gromada
*Assistant Examiner*—Y. Quach
*Attorney, Agent, or Firm*—Cushman, Darby & Cushman

[57] ABSTRACT

An analog indicator for an automotive vehicle is provided. This indicator includes a self-luminescent indicating pointer and a dial plate on which a fluorescent layer is formed. When an input signal indicative of a indicating parameter is changed, the pointer radiates an ultraviolet ray onto the fluorescent layer on the dial plate so that it glows. An observer can thus visually identify a value indicated by the pointer or displacement of the pointer.

9 Claims, 11 Drawing Sheets

ANALOG INDICATOR WITH SELF-LUMINESCENT POINTER

BACKGROUND OF THE INVENTION

1. Field of The Invention

The present invention relates generally to an improvement on an analog indicator. More particularly, the invention is directed to an analog indicator including a self-luminescent pointer and a fluorescent display plate which may be employed in a tachometer, a speedometer, a fuel gauge, a temperature gauge, or so forth for an automotive vehicle.

2. Description of The Prior Art

U.S. Pat. No. 5,050,045, issued on Sep. 17, 1991, assigned to the same assignee as the present application, discloses a self-luminescent pointer device for a gauge such as an automotive speedometer. This conventional pointer device includes an indicating pointer provided with a discharge lamp about which a light insulating film is wrapped exposing part of an upper surface to define a slit-like transparent section. Turning on the discharge lamp causes the slit-like transparent section to glow so that an observer, or vehicle operator may visually perceive displacement of the pointer over the display plate.

Additionally, in a modification of the above arrangement, a slit-like transparent section is also formed on a side surface of the discharge lamp to illuminate an area on the display plate to define a strip-like illuminated portion which is shifted toward a low-speed indicating zone from the indicating pointer.

The above prior art pointer device, however, raises a drawback in that while the indicating pointer can be seen in the dark by its own glow, the brightness of an area around notches graduated on the display plate may be insufficient for the observer as the display plate is illuminated by the light only projected from the indicating pointer.

SUMMARY OF THE INVENTION

It is therefore a principal object of the present invention to avoid the disadvantages of the prior art.

It is another object of the invention to provide an analog indicator which includes a display plate operable to glow in response to displacement of an indicating pointer on a dial plate for allowing an observer to visually identify a displacement range of the indicating pointer and displacement speed thereof.

According to one aspect of the present invention, there is provided a gauge which comprises a self-luminescent indicating pointer mounted on a pointer shaft which is rotatable according to an input signal and a luminescent layer provided on a dial plate, the luminescent layer being responsive to light emitted substantially toward the dial plate from the self-luminescent indicating pointer to glow.

In the preferred mode, the self-luminescent indicating pointer includes a discharge lamp which has an ultraviolet radiating elements for projecting ultraviolet light onto the luminescent layer on the dial plate. The luminescent layer is made of a fluorescent substance which is responsive to the ultraviolet light projected from the ultraviolet radiating elements to brighten. Additionally, a visible light radiating elements may be provided on a front surface of the discharge lamp which emits visible light toward a gauge observer.

According to another aspect of the present invention, there is provided an analog indicator which comprises a dial plate, an indicating pointer responsive to an input signal to move over the dial plate, an illuminating means provided in the indicating pointer for emitting illuminating light, a luminescent means provided on the dial plate which is responsive to the illuminating light from the illuminating means to brighten, and an illuminating control means responsive to the input signal to activate the illuminating means for emitting the illuminating light onto the luminescent means.

In the preferred mode, the dial plate has first and second marks thereon, the first mark indicating a higher level of the input signal, the second mark indicating a lower level of the input signal. The illuminating means is oriented to an area on the luminescent means shifted toward the second mark. Additionally, the illuminating control means is operable to be responsive to increase in a level of the input signal to provide a first control signal to the illuminating means so that the illuminating means projects the illuminating light onto an area on the luminescent means shifted toward the second mark from the indicating pointer when the indicating pointer moves toward the first mark. The illuminating control means is also responsive to decrease in a level of the input signal to provide a second control signal to the illuminating means so that the illuminating means projects the illuminating light onto an area on the luminescent means shifted toward the first mark from the indicating pointer when the indicating pointer moves toward the second mark. Further, the illuminating control means may be adapted to be responsive to a variation rate of the input signal to modify intensity of the illuminating light emitted from the illuminating means.

BRIEF DESCRIPTION OF THE DRAWINGS

The present invention will be understood from the detailed description given hereinbelow and from the accompanying drawings of the preferred embodiments which are given for explanation and understanding only and are not intended to imply limitations to the invention.

In the drawings.

DESCRIPTION OF THE PREFERRED EMBODIMENT

Figures 1, 3:
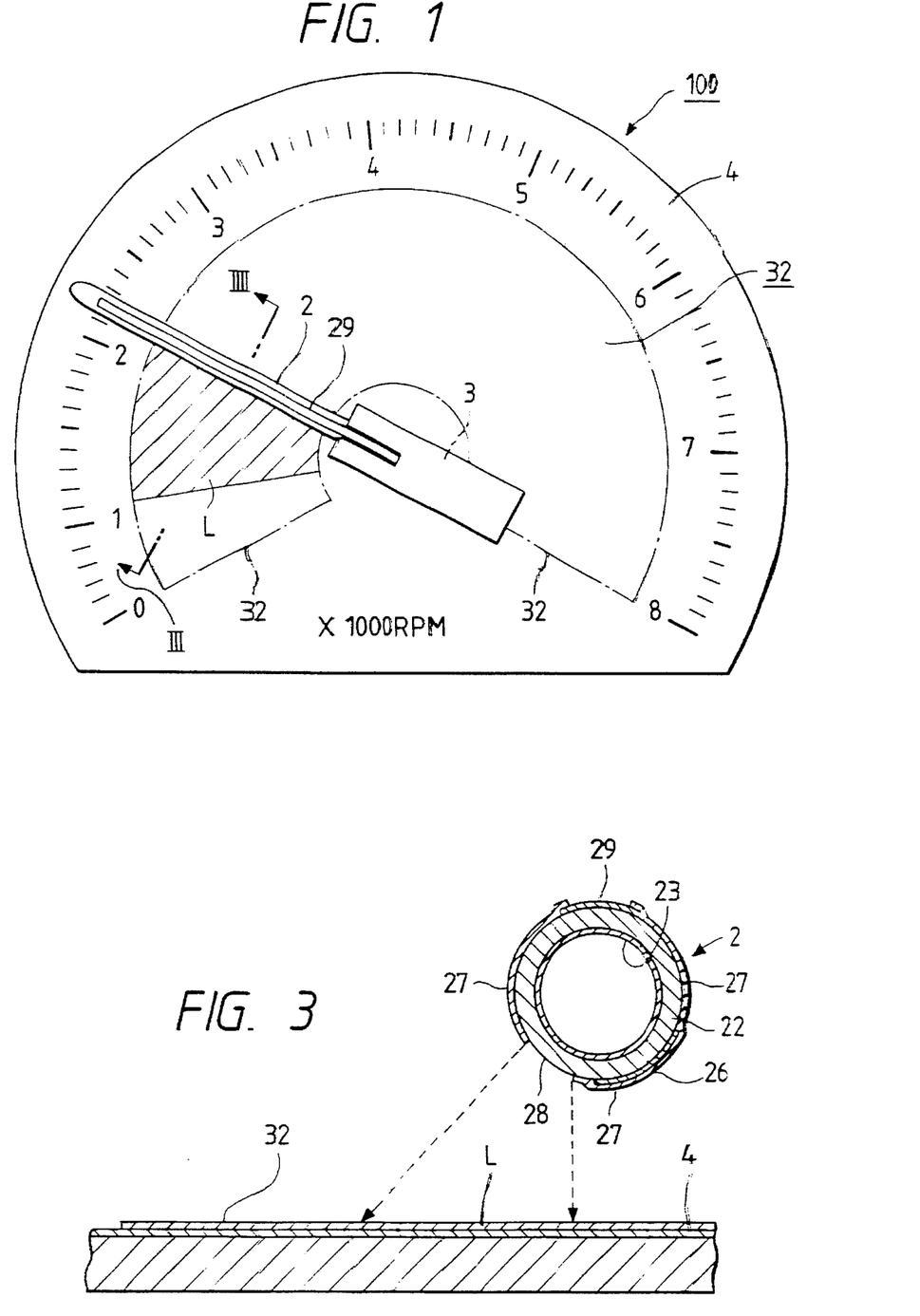
FIG. 1 is a front view which shows an analog tachometer for an automotive vehicle according to the present invention which includes a self-luminescent pointer and a fluorescent display plate.
FIG. 3 is a cross sectional view taken along the line III—III in FIG. 1 which shows a self-luminescent pointer of a tachometer.
Figure 2:
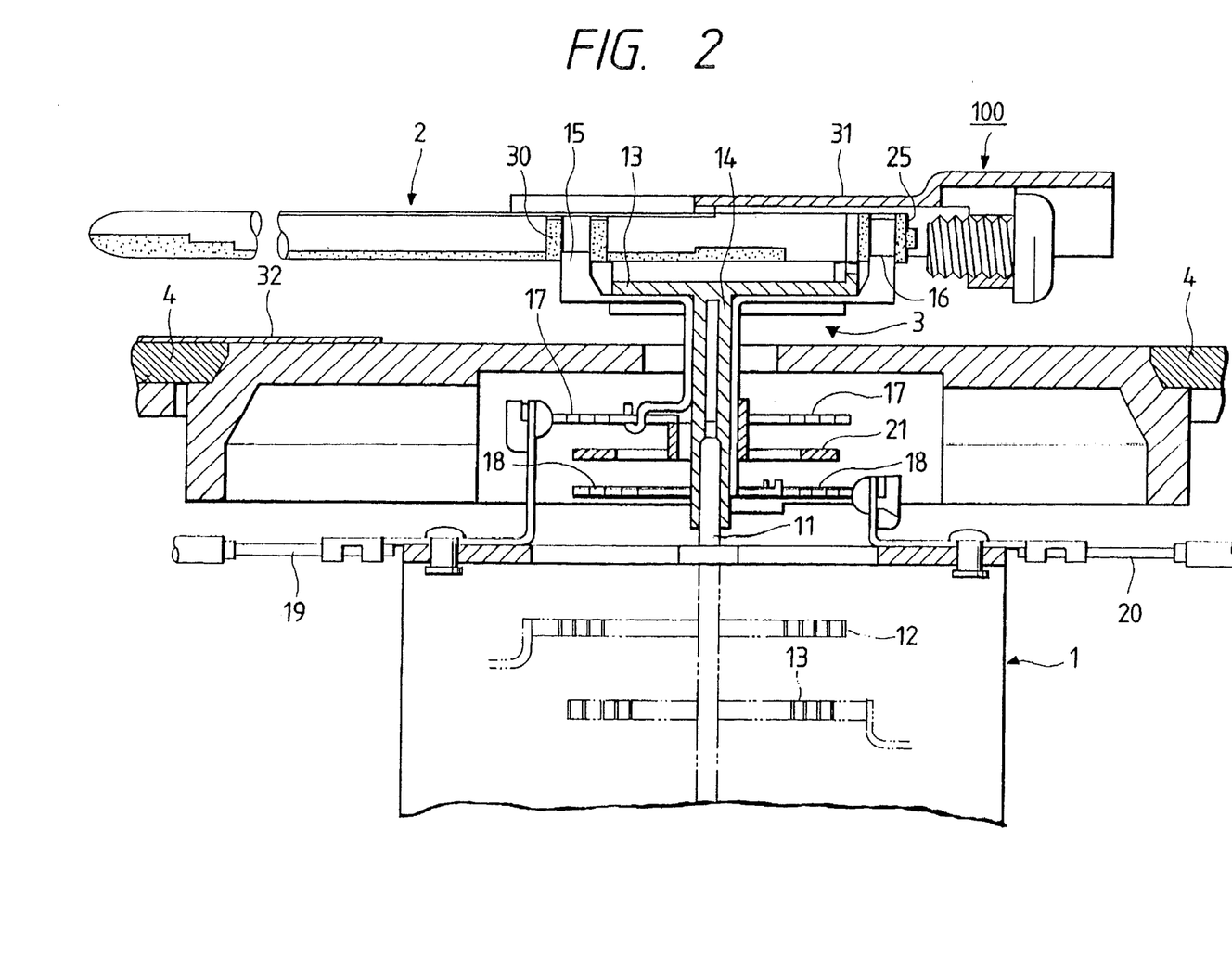
FIG. 2 is a vertical cross sectional view which shows a tachometer according to the invention.

Referring now to the drawings, wherein like numbers refer to like parts in the several views, particularly to FIGS. 1 and 2, there is shown a tachometer 100 for an automotive vehicle according to the present invention.

The tachometer 100 includes generally a pointer driving mechanism 1, a pointer socket 3, a self-luminescent indicating pointer 2, and a character display plate 4 (i.e., a dial) on which notches indicative of tachometer values are printed. The pointer driving mechanism 1 is disposed within a meter casing (not shown). The pointer socket 3 is fixedly attached to an end portion of a pointer shaft 11. The self-luminescent indicating pointer 2 is provided with a discharge lamp which is detachably secured to the pointer socket 3. The character display plate 4 is disposed within the meter casing.

The pointer driving mechanism 1 is of a moving coil type which is responsive to an input signal variable according to engine speed to provide torque to the pointer shaft 11. The pointer shaft 11 is held at a position where the input torque and spring forces of hairsprings 12 and 13 are balanced. The hairsprings 12 and 13 are installed on the pointer shaft 11 in the illustrated manner.

The pointer socket 3 includes a socket body 13 made of a synthetic resin which has a connecting shaft 14 extending from the bottom of the socket body. A pair of terminal portions 15 and 16 are arranged in the socket body 13. The terminal portions 15 and 16 have substantially U-shaped ends, or hooks which respectively engage hairsprings 17 and 18 serving as a feeder. The hairsprings 17 and 18 are secured around the connecting shaft 14, while peripheral portions thereof are connected to feeder lines 19 and 20 respectively. Arranged between the hairspings 17 and 18 is an insulating plate 21.

Figure 4:
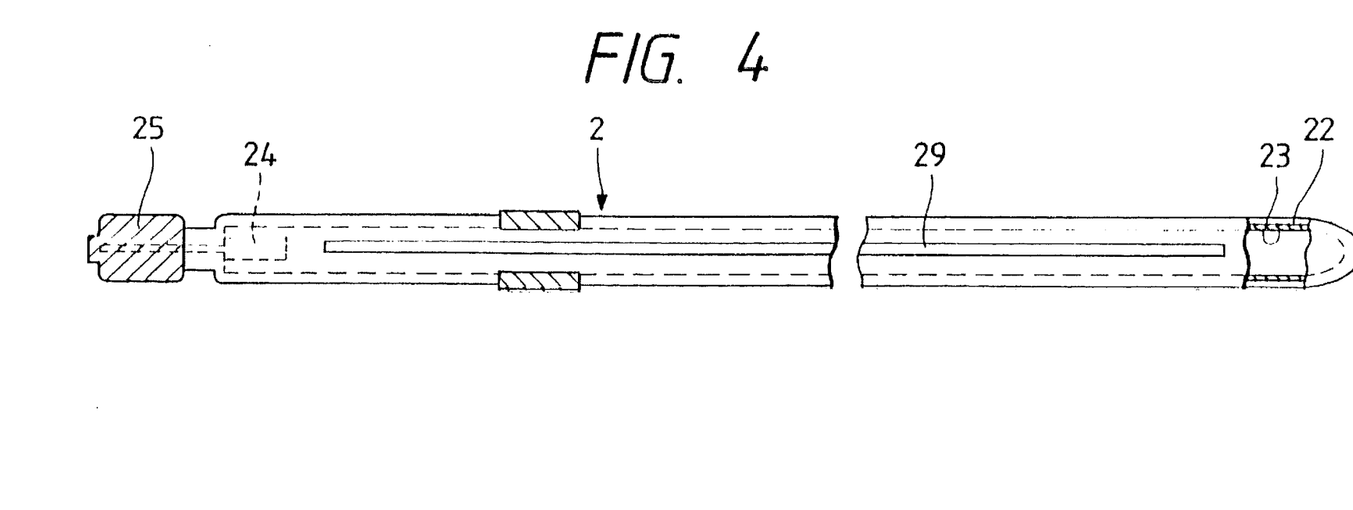
FIG. 4 is an exploded front view which shows a self-luminescent pointer of a tachometer according to the invention.
Figure 5:
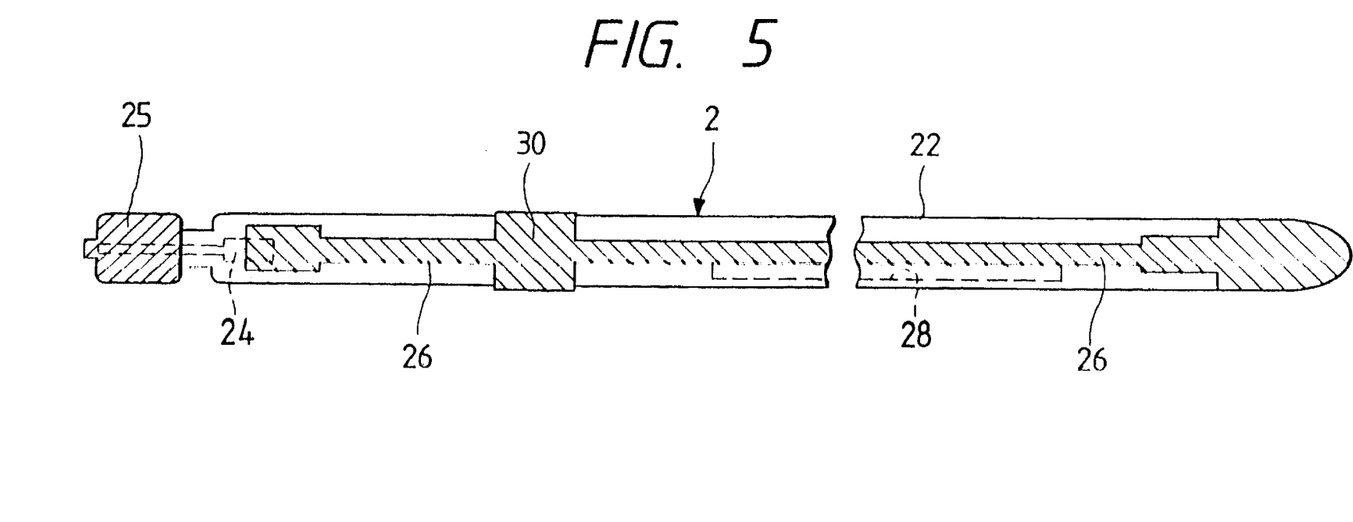
FIG. 5 is an exploded bottom view which shows a self-luminescent pointer of a tachometer according to the invention.

The self-luminescent indicating pointer 2, as shown in FIGS. 4 and 5, includes a strip-like discharge lamp which is provided with a glass bulb 22 filled with a xenon gas. On an inner surface of the bulb 22, a fluorescent layer 23 is formed which serves to receive a ultraviolet light of 147 nm in wavelength and subsequently emit ultraviolet light of, for example, 254 nm in wavelength. On a base portion of the bulb 22, an internal electrode 24 is mounted which is electrically connected to a terminal section 25 through a lead wire. The terminal section 25 is made of a silver paste and arranged on an outer surface of the base portion of bulb 22.

A strip-like external electrode 26 is, as shown in FIG. 5, attached to the back surface of the bulb 22. Additionally, a light shielding film 27 is, as shown in FIG. 3, wrapped about the entire peripheral surface of the bulb 22 other than an ultraviolet radiating section 28 and a visible light radiating section 29. A terminal section 30 coated with a silver paste which is connected to the external electrode 26 is attached to an outer surface of the light shielding film 27.

The ultraviolet radiating section 28 is formed on the outer surface of the bulb 22 which extends longitudinally and is exposed for radiating an ultraviolet light onto a low-engine speed indicating zone on the character display plate 4. The width of the ultraviolet radiating section 28, as can be seen in FIG. 3, may range from $1/10$ to $1/6$ of the circumference of the bulb 22.

The visible light radiating section 29 is, as shown in FIG. 4, provided with a slit-like fluorescent layer having a width of about 1 mm which extends longitudinally on the front surface, as viewed from an observer or vehicle operator, of the self-luminescent indicating pointer 2 and serves to receive ultraviolet light of 254 nm in wavelength and to subsequently emit visible light. It will be noted that the visible light radiating section 29 may be made of various types of fluorescent substance which emit white or blue visible light, for example.

With the above arrangements, the self-luminescent indicating pointer 2 is, as shown in FIG. 2, fitted into the terminal portions 15 and 16 of the pointer socket 3 so that the terminal sections 25 and 30 are electrically connected to the terminal portions 15 and 16 of the pointer socket 3. Mounted on the pointer socket 3 is a pointer cover 31.

Figure 6:
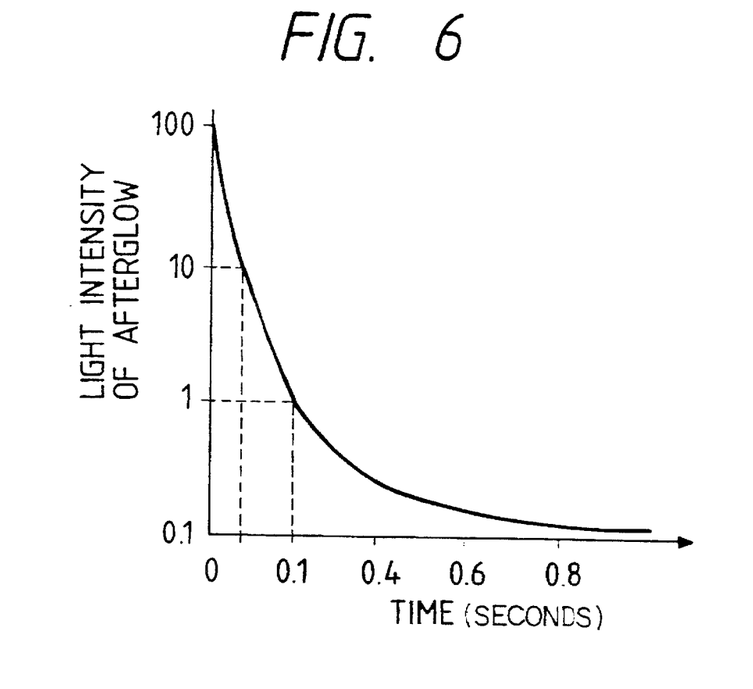
FIG. 6 is a graph which shows afterglow characteristics of a fluorescent substance.

Formed on a substantially fan-shaped section (as shown by a broken line in FIG. 1) inside the notches provided on the character display plate 4 is a fluorescent layer 32 which receives ultraviolet light at 254 nm in wavelength and which emits visible light. The fluorescent layer 32 is made of a fluorescent substance which assumes afterglow characteristics, as shown in FIG. 6, and is formed by means of screen printing.

Figure 7:
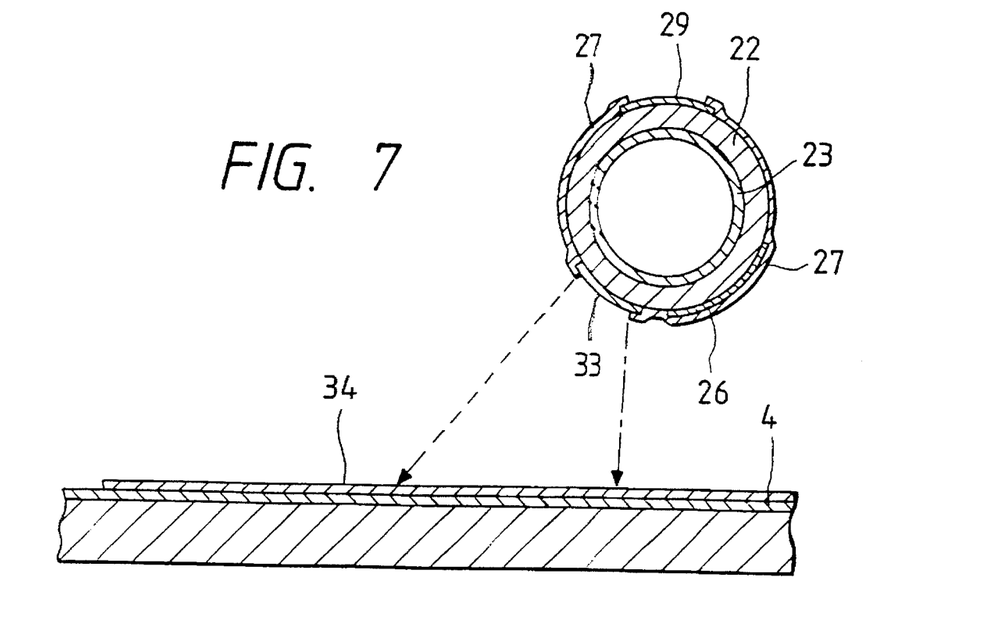
FIG. 7 is a cross sectional view which shows an alternative embodiment of a self-luminescent pointer as shown in FIG. 3.

As described above, the ultraviolet radiating section 28 includes an exposed portion of the outer surface of the bulb 22, however, it may alternatively be formed with a fluorescent layer 33, as shown in FIG. 7, which serves to modify ultraviolet light at 254 nm-wave are to project ultraviolet light at 365 nm onto the character display plate 4. In this case, a fluorescent layer 34 which receives ultraviolet light of 365 nm in wavelength of which emits visible light should preferably be formed on the character display plate 4 as shown in FIG. 7.

With the above arrangements, the tachometer 100 is electrically connected to a high voltage / high frequency lighting circuit (not shown) through the feeder lines 19 and 20 so that the discharge lamp of the self-luminescent indicating pointer 2 glows.

In operation, turning on the discharge lamp of the self-luminescent indicating pointer 2 causes the bulb 22 to generate therein ultraviolet light at 147 nm in wavelength which, in turn, is changed into an ultraviolet light of 254 nm in wavelength through the fluorescent layer 23 in the bulb 22. This ultraviolet light is then converted into the visible light through the fluorescent layer of the visible light radiating section 29 on the front surface of the self-luminescent indicating pointer 2 so that the slit-like beam is projected from the self-luminescent pointer 2 toward the observer. It will be appreciated that the observer may visually identify a position of the self-luminescent pointer 2 or the notch on the character display plate 4 indicated by the pointer.

Additionally, the ultraviolet radiating section 28 of the self-luminescent indicating pointer 2 emits the ultraviolet light of 254 nm in wavelength onto the fluorescent layer 32 on the character display plate 4 to define a brightly fluorescing area L, as hatched in FIG. 1, shifted toward a low-engine speed indicating zone.

A fluorescent substance used for the fluorescent layer 32 assumes afterglow characteristics as shown in FIG. 6. Therefore, pivotal movement of the self-luminescent pointer 2 in a clockwise direction according to an increase in engine speed causes an area on the character display plate 4 over which the self-luminescent indicating pointer 2 has passed to remain glowing as a radar indicator. This afterglow lo characteristic appears on a wider zone as the self-luminescent indicating pointer 2 moves fast in a clockwise direction so that the afterglow goes out gradually from a portion remote from the pointer 2. With this arrangement, the afterglow, or the fluorescing area L enables an observer to visually identify a range of movement and movement speed of the pointer 2.

In the above discussed embodiment, the visible light radiating section 29 is provided on the front surface of the self-luminescent indicating pointer 2, however, it may alternatively be omitted, while only the ultraviolet radiating section 28 is provided on the back surface facing the character display plate 4.

Referring to FIGS. 8 to 11, there is shown an alternative embodiment according to the present invention.

Figure 9:
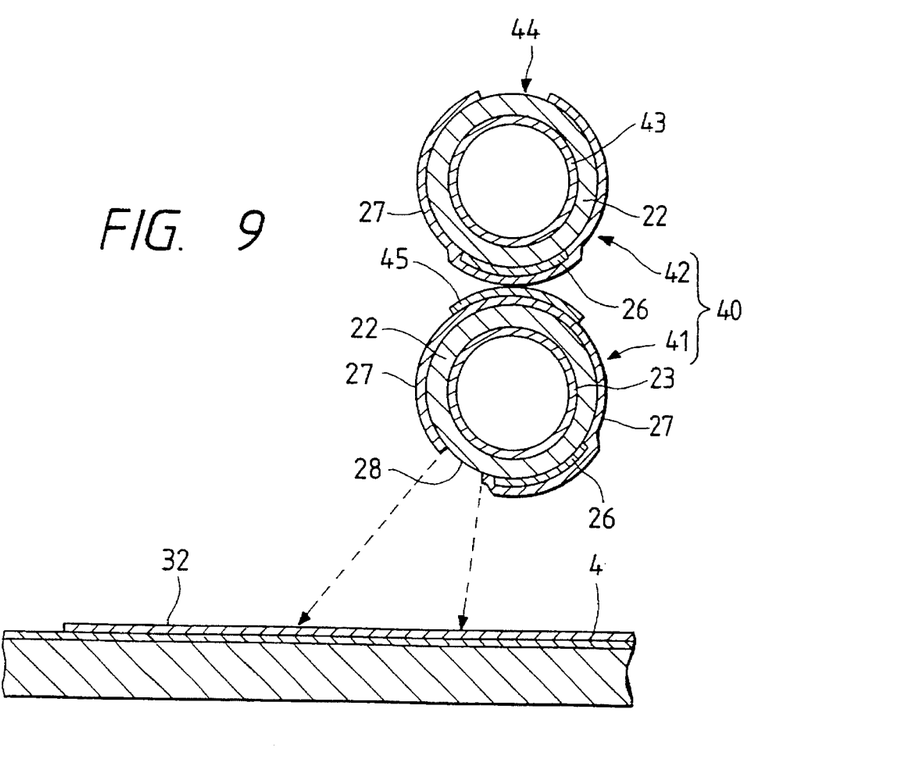
FIG. 9 is a cross sectional view taken along the line IX—IX in FIG. 8.

A self-luminescent indicating pointer 40, as shown in FIG. 9, includes upper and lower discharge lamps 42 and 41 which are arranged in parallel to each other.

The lower discharge lamp 41 is essentially the same as the self-luminescent indicating pointer 2 of the above first embodiment except for the visible light radiating section 29 provided on the upper surface. A bulb 22 includes on its inner surface a fluorescent layer 23 and an ultraviolet radiating section 28 on an area of an outer surface oriented to an upper surface of a character display plate 4 in the illustrated manner. A light shielding film 27 covers the entire circumferential surface of the bulb 22 other than the ultraviolet radiating section 28. An internal electrode arranged in a base portion of the bulb 22, an external electrode 26 attached to an outer surface facing the character display plate 4, and a xenon gas charged in the bulb are the same as in the first embodiment.

The upper discharge lamp 42 includes a fluorescent layer 43, a visible light radiating section 44, and a light shielding film 27. The fluorescent layer 43 is formed on an inner surface of the bulb 22 which serves to receive ultraviolet light at 147 nm in wavelength and to emit visible light. The light shielding film 27 is attached on an outer surface of the bulb 22 so as to expose a slit-shaped portion which defines the visible light radiating section 44. An internal electrode, an external electrode 26, and a xenon gas charged in the bulb are the same as the lower discharge lamp 41.

The upper and lower discharge lamps 42 and 41 are attached to each other through an insulating layer 45 and these lamps are inserted into terminal portions of a pointer socket (not shown) which is similar to the first embodiment.

A fluorescent layer 32 is formed on the character display plate 4 in the same manner as the first embodiment. The fluorescent layer 32 is made of a fluorescent substance which is responsive to ultraviolet light of 254 nm in wavelength to provide the visible light which exhibits afterglow characteristics.

Figure 10:
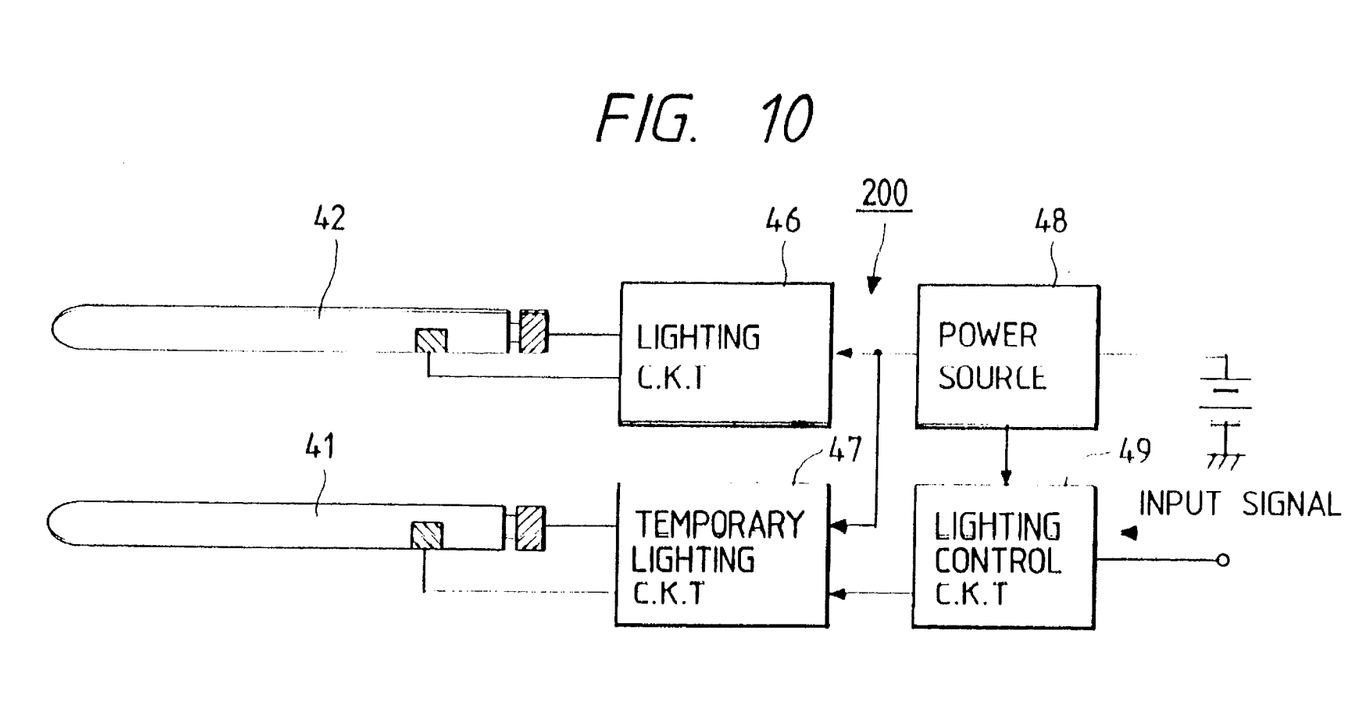
FIG. 10 is a block diagram which shows a lighting control unit for a discharge lamps of a tachometer according to the present invention.

Referring to FIG. 10, a lighting control unit 200 is shown which includes a lighting circuit 46, a temporary lighting circuit 47, an electric power source 48, and a lighting control circuit 49. The upper and lower discharge lamps 42 and 41 are electrically connected to the lighting circuit 46 and the temporary lighting circuit 47 respectively. The electric power source 48 provides the power to the lighting circuit 46, the temporary lighting circuit 47, and the lighting control circuit 49. The lighting circuits 46 and 47 respectively include an oscillator and a transducer, and provide a high frequency electric power (e.g., 35 kHz, 1 kv) to the upper and lower discharge lamps 42 and 41.

The control circuit 49 is operable to monitor a variation in a level of an input signal to the self-luminescent indicating pointer 40 which represents engine speed and provides a lighting control signal to the temporary lighting circuit 47 only when the pointer 40 is turned in a clockwise direction or toward a high-engine speed indicating zone.

Figure 11:
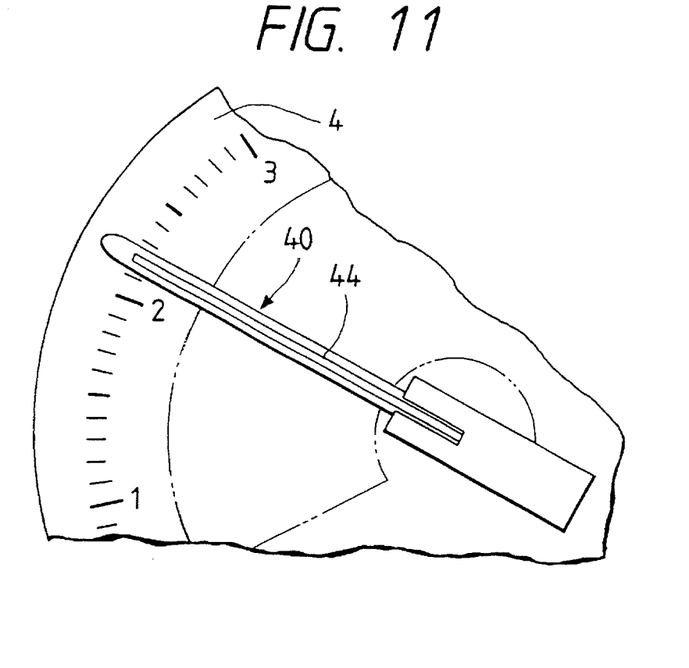
FIG. 11 is a partial front view which shows a self-luminescent pointer which remains pointing toward any one of notches provided on a display plate when engine speed is constant.

With the above arrangements, when engine speed is constant so that the self-luminescent indicating pointer 40 stands still or when the engine speed is decreased, the control circuit 49 provides no control signal to the temporary lighting circuit 47 so that the temporary lighting circuit does not supply a high-frequency electric power to the lower discharge lamp 41. Thus, only the upper discharge lamp 42 is turned on in response to a lighting signal from the lighting circuit 46 while the lower discharge lamp 41 remains turned off. The ultraviolet radiating section 28 of the lower discharge lamp 41, as shown in FIG. 11, does not discharge the ultraviolet ray onto the character display plate 4. Accordingly, an observer may see the visible light projected only from the visible light radiating section 44 of the upper discharge lamp 42 to perceive the notch indicated by the self-luminescent indicating pointer 40 clearly when the engine speed is constant or decreased.

Figure 8:
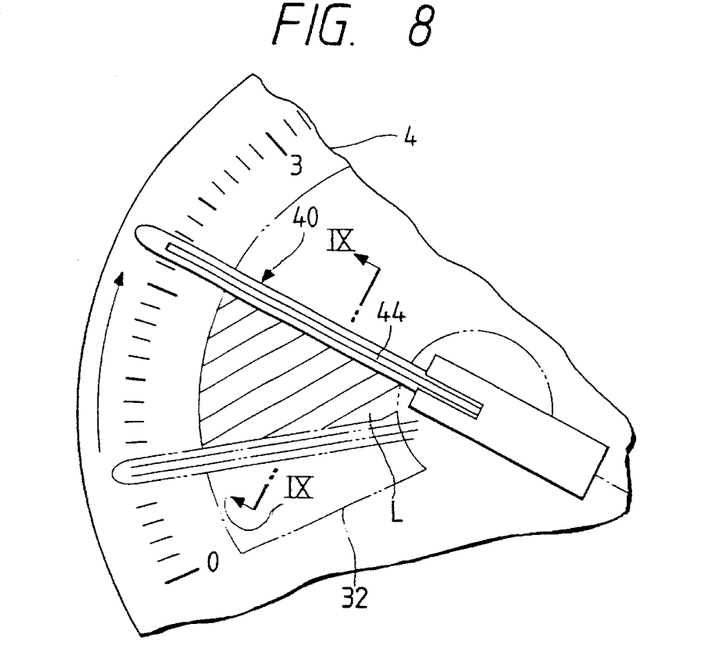
FIG. 8 is a partial front view which shows an alternative embodiment of a tachometer according to the invention.

Alternatively, during increase in engine speed, the control circuit 49 is responsive to the input signal to the self-luminescent indicating pointer 40 representing the increase in engine speed to provide a lighting control signal to the temporary lighting circuit 47. The temporary lighting circuit 47 then supplies the high-frequency electric power from the electric power source 48 to the lower discharge lamp 41 so that the ultraviolet radiating section 28 discharges the ultraviolet ray onto an area of the fluorescent layer 32 shifted toward a low-engine speed indicating zone from the pointer 40 to define a fan-shaped portion L, as shown in FIG. 8, brightened with the afterglow.

Accordingly, the observer may perceive the luminescence of the area L and the afterglow thereof appearing just after the pointer 40 moves when the engine speed is increased, and visually identify a response rate of vehicle acceleration.

Referring to FIGS. 12 to 16, there is shown a third embodiment according to the present invention.

Figure 13:
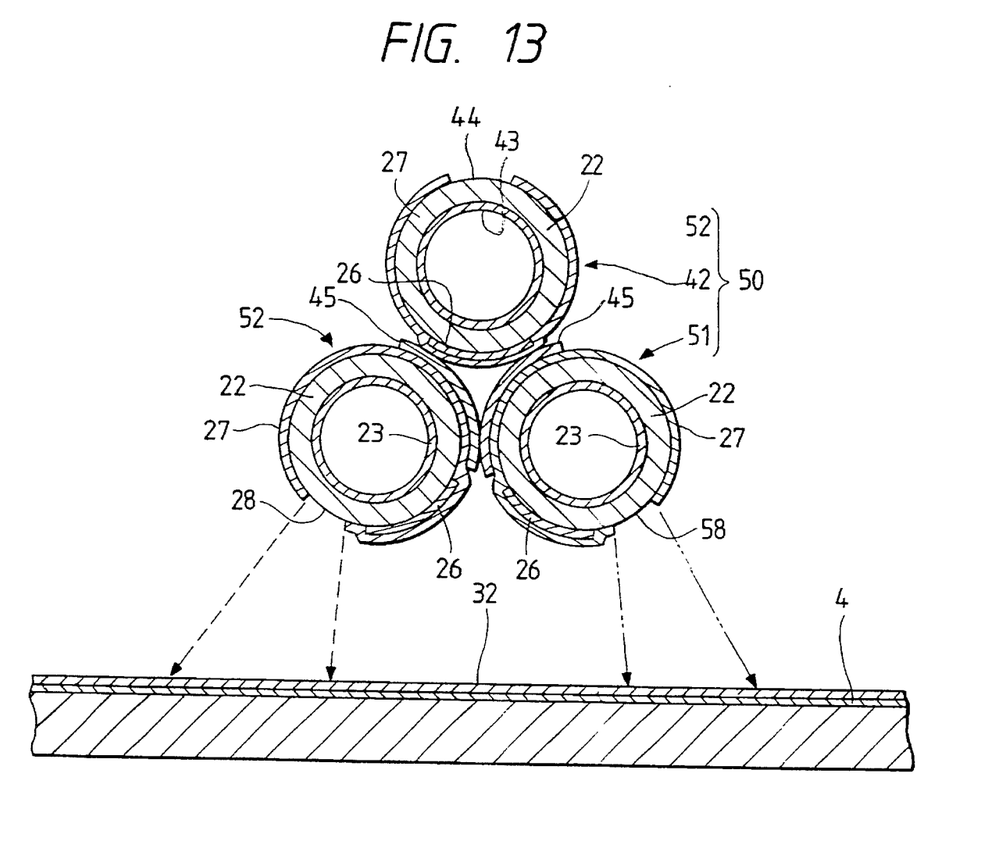
FIG. 13 is an exploded cross sectional view taken along the line XIII—XIII in FIG. 12.

A self-luminescent indicating pointer 50, as shown in FIG. 13, includes three discharge lamps, or an upper discharge lamp 42, a lower high-speed zone illuminating discharge lamp 51, and a lower low-speed zone illuminating discharge lamp 52 which extend in parallel to each other, and are bonded through insulating films 45. These lamps are electrically connected to terminal portions (not shown) of a pointer socket respectively in the same manner as in the above embodiment.

The low-speed zone illuminating discharge lamp 52, similar to the lower discharge lamp 41 in the above second embodiment, includes a bulb 22, a fluorescent layer 23 on an inner surface of the bulb, an ultraviolet radiating section 28 on an area of an outer surface of the bulb oriented to an area of an upper surface of a character display plate 4 shifted toward a low-engine speed indicating zone from the pointer, and a light shielding film 27 covers the entire circumferential surface of the bulb 22 other than the ultraviolet radiating section 28. An internal electrode arranged in a base portion of the bulb 22, an external electrode 26 attached to an outer surface of the bulb facing the character display plate 4, and a xenon gas charged in the bulb are the same as the self-luminescent indicating pointer 2.

The high-speed zone illuminating discharge lamp 51 includes a bulb 22, a fluorescent layer 23 on an inner surface of the bulb, an ultraviolet radiating section 58 on an area of an outer surface of the bulb oriented to an area of an upper surface of a character display plate 4 shifted toward a high-engine speed indicating zone from the pointer, and a light shielding film 27 covers a circumferential surface of the bulb 22 other than the ultraviolet radiating section 58. An internal electrode arranged in a base portion of the bulb 22, an external electrode 26 attached to an outer surface of the bulb facing the character display plate 4, and a xenon gas charged in the bulb are the same as the self-luminescent indicating pointer 2.

Additionally, the upper discharge lamp 42 is mounted on the lower discharge lamps 51 and 52 and has the same structure as that of the upper discharge lamp 42 in the second embodiment wherein a slit-like visible light radiating section 44 is provided on an upper surface or front surface thereof facing an observer.

Figure 12:
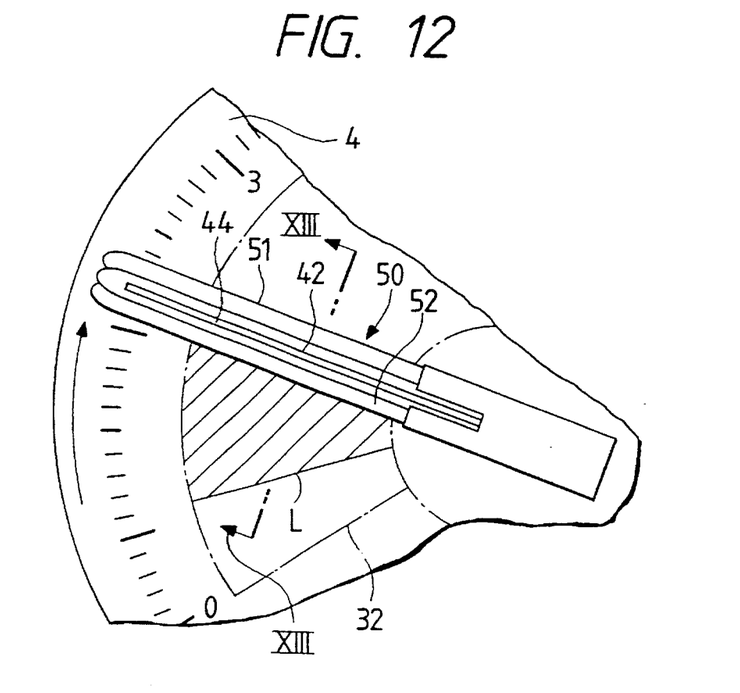
FIG. 12 is partial front view which shows a third embodiment of a tachometer according to the present invention.

Formed on an outer surface of the character display plate 4 radially inward of the notches (marks indicating tachometer values) is a fan-shaped fluorescent layer 32 made of a fluorescent substance which receives ultraviolet light at 254 nm in wavelength and which emits visible light which exhibits the same afterglow characteristics as described above.

Figure 14:
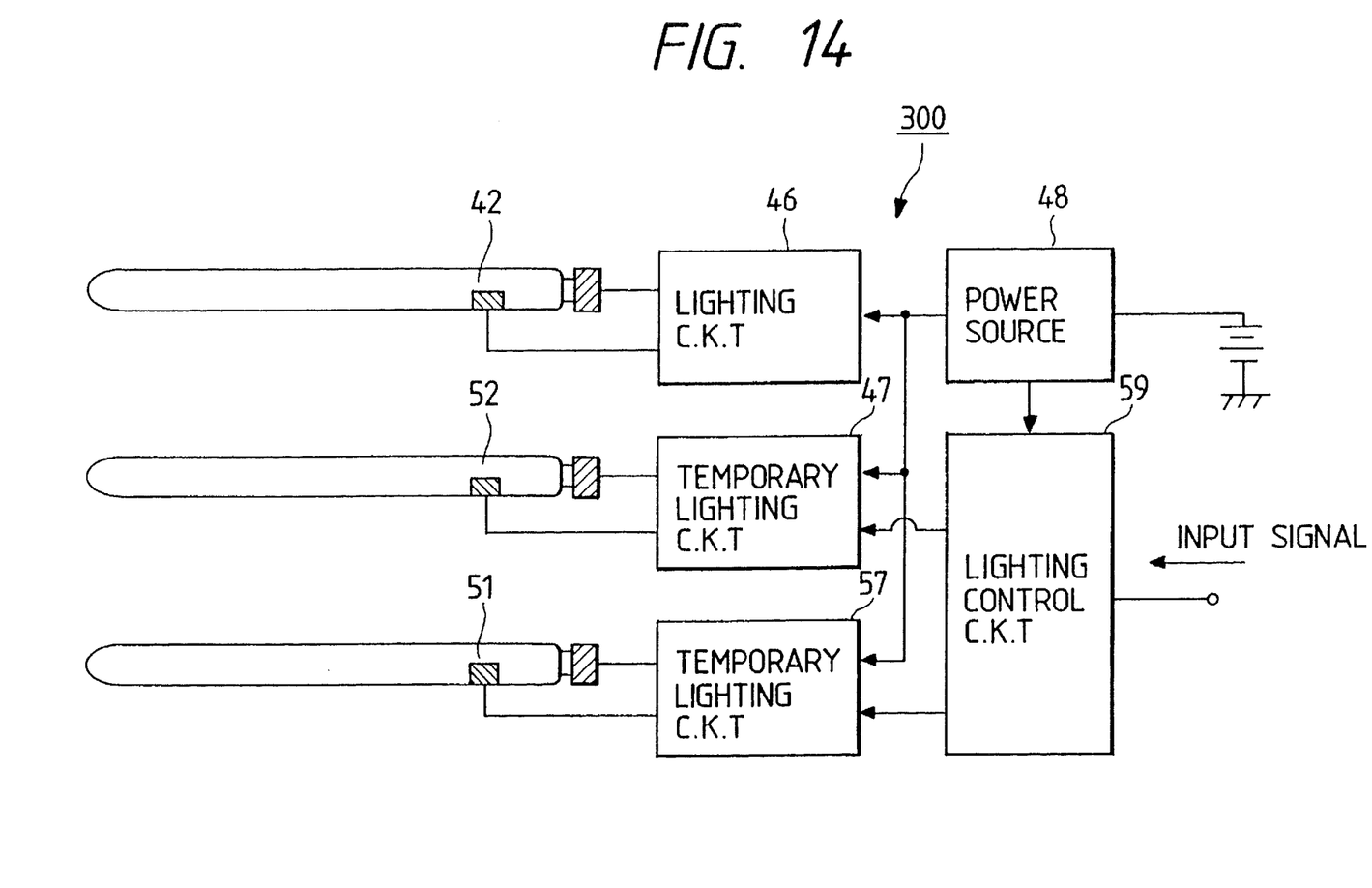
FIG. 14 is a block diagram which shows an alternative embodiment of a lighting control unit for a discharge lamps of a tachometer according to the present invention.

Referring to FIG. 14, a lighting control unit 300 is shown which includes a lighting circuit 46, first and second temporary lighting circuit 47 and 57, an electric power source 48, and a lighting control circuit 49. The lighting circuit 46 is electrically connected to the upper discharge lamp 42. The first and second temporary lighting circuits 47 and 57 are connected to the low-speed zone illuminating discharge lamp 52 and the high-speed zone illuminating discharge lamp 51 respectively. These lighting circuits 46, 47, and 57, likewise to the above embodiment, include an oscillator and a transducer, and provide a high frequency electric power (e.g. 35 kHz, 1 kv) to the discharge lamps 42, 52, and 51.

The lighting control circuit 59 is adapted to monitor a variation in a level of an engine speed signal to determine whether engine speed is increased or decreased. When the engine speed is increased so that the self-luminescent indicating pointer 50 moves toward a high-engine speed indicating zone, the lighting control circuit 59 provides a lighting control signal to the temporary lighting circuit 47, while when the engine speed is decreased, the self-luminescent indicating pointer 50 moving toward a low-engine speed indicating zone, the lighting control is output to the temporary lighting circuit 57.

Figure 16:
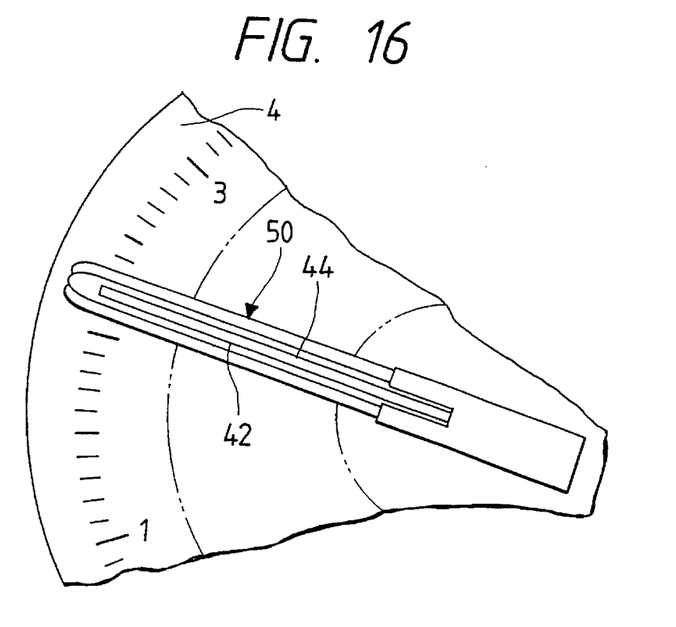
FIG. 16 is a partial front view which shows a self-luminescent pointer which remains pointing toward any one of notches graduated on a display plate when engine speed is constant.

With the above arrangements, when engine speed is constant, the self-luminescent indicating pointer 50 remaining pointing toward any one of the notches on the character display plate 4, the lighting control circuit outputs no lighting control signal. Thus, the first and second temporary lighting circuits 47 and 57 do not provide the lighting high-frequency power to the lower discharge lamps 52 and 51 so that the ultraviolet radiating sections 28 and 58, as shown in FIG. 16, both emit no ultraviolet ray onto the character display plate 4.

Accordingly, when the engine speed is constant, the observer may see the visible light only projected from the visible light radiating section 44 of the upper discharge lamp 42 to perceive the notch on the character display plate 4 indicated by the pointer 50.

When the vehicle accelerates to increase engine speed, the lighting control circuit 59 outputs a lighting control signal to the temporary lighting circuit 47 for turning on the low-speed zone illuminating discharge lamp 52. The ultraviolet radiating section 28 of the low-speed zone illuminating discharge lamp 52 then radiates the ultraviolet ray onto the fluorescent layer 32 so that the area L shifted toward the low-engine speed indicating zone from the pointer 50, as shown in FIG. 12, brightly glows.

Figure 15:
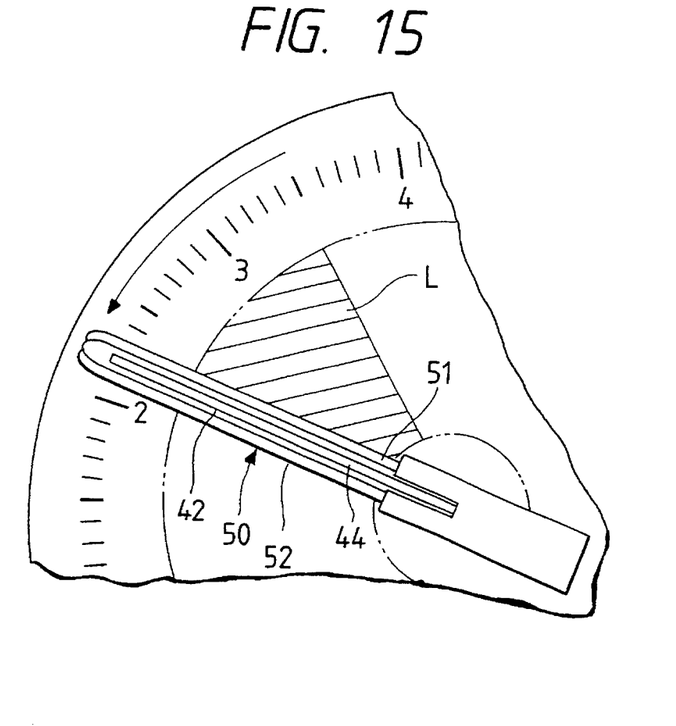
FIG. 15 is a partial front view which shows a self-luminescent pointer which moves toward a low-engine speed indicating zone.

During decrease in engine speed, the control circuit 59 outputs the lighting control signal to the temporary lighting circuit 57. The temporary lighting circuit 57 then supplies the high-frequency electric power to the high-speed zone illuminating discharge lamp 51 so that the ultraviolet radiating section 58 projects the ultraviolet ray onto an area L of the fluorescent layer 32 shifted toward a high-engine speed indicating zone from the pointer 50, as shown in FIG. 15.

As described above, when the self-luminescent indicating pointer 50 stands still, indicating any one of the notches on the character display plate 4, only the visible light radiating section 44 of the upper discharge lamp 42 projects the visible light. The increase in vehicle speed causes the pointer 50 to rotate Toward the high-engine speed indicating zone on the character display plate 4, the area L on the fluorescent layer 32 shifted toward the low-engine speed indicating zone radiating brightly. Upon reduction in engine speed, the pointer 50 turns toward the low-engine speed indicating zone, the area L shifted toward the high-engine speed indicating zone from the pointer radiating brightly. Accordingly, the observer may see the luminescence of the area L and the afterglow thereof to visually identify a response rate of the engine or a change in vehicle speed.

Figure 17:
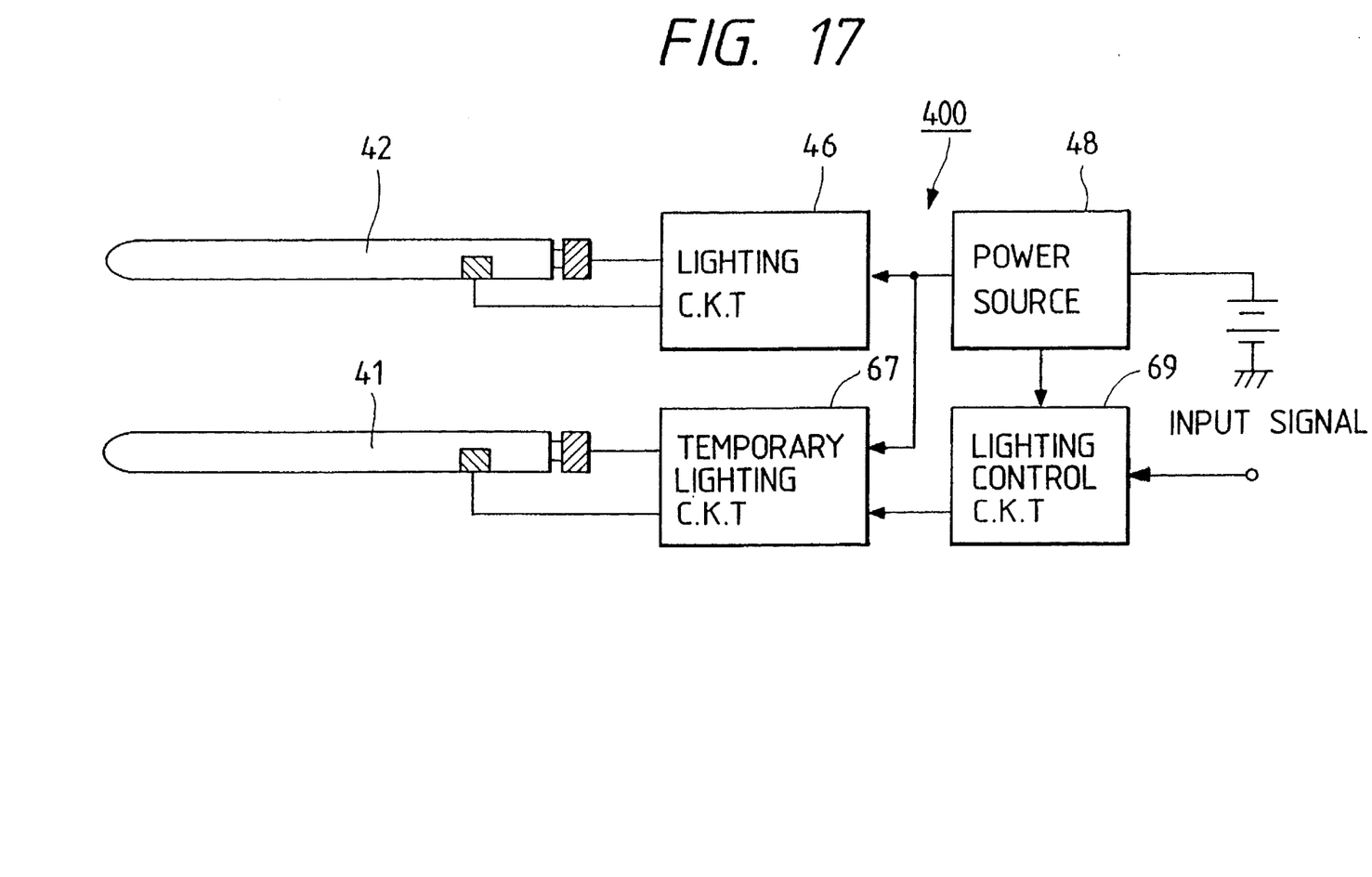
FIG. 17 is a block diagram which shows a third embodiment of a lighting control unit for discharge lamps of a self-luminescent pointer.

Referring to FIG. 17, there is shown a lighting control unit 400 which is a modification of the lighting control unit 200 as shown in FIG. 10. The lighting control unit 400 differs from the lighting control unit 200 in that a lighting control unit 69 is operable to modify the light intensity of the lower discharge lamp 41 according to a variation in engine speed. Other arrangements are the same as in the light control unit 200 as shown in FIG. 10.

The lighting control circuit 69 is adapted for monitoring a pointer-driving input signal indicative of engine speed to determine a variation in a signal level with respect to time (i.e., a variation rate of engine speed), and provides a control signal to the temporary lighting circuit 67. The temporary lighting circuit 67 then modifies a duty ratio of wave form of a high-frequency power supplied from the electric power source 48 based on the variation in engine speed, and provides it to the lower discharge lamp 41.

With this arrangement, when engine speed is constant so that the self-luminescent indicating pointer 40 remains pointing toward any one of the notches on the character display plates or when the engine speed is decreased, the upper discharge lamp 42 is turned on while the lower discharge lamp 41 remains off, the slit-like visible light radiating section 44 projecting the visible light.

On the other hand, during increase in engine speed, the lighting control circuit 69 increases the brightness of the lower discharge lamp 41 as a variation rate of engine speed is increased.

Accordingly, displacement of the self-luminescent indicating pointer 40 toward the high-engine speed indicating zone on the display plate 4 at a high speed causes an amount of ultraviolet discharged from the ultraviolet radiating section 28 of the lower discharge lamp 41 to increase. When the displacement speed of the pointer 40 is reduced, the amount of ultraviolet discharged from the ultraviolet radiating section 28 is decreased. Therefore, the brightness of the area L on the fluorescent layer 32 is increased as acceleration of a vehicle becomes high, while it is decreased as the acceleration becomes low.

It will be appreciated that an observer can visually identify the displacement of the pointer, or a degree of acceleration of the vehicle based on size of the illuminated area L and/or the luminosity and the afterglow thereof.

The above described lighting control unit 400 may alternatively be applied to the third embodiment as shown in FIGS. 12 to 16.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims. For example, the above described lighting arrangements may be applied to a speedometer, a fuel gauge, or a temperature gauge.

What is claimed is:

1. A gauge comprising:

an indicating pointer moving in response to an input signal, said indicating pointer including a discharge lamp having ultraviolet radiating means for radiating ultraviolet light;

a luminescent layer provided on a dial plate, said luminescent layer being made of a fluorescent substance which has afterglow characteristics and which is responsive to said ultraviolet light radiated from said ultraviolet radiating means to brighten said dial plate, an amount of an afterglow area of said luminescent layer on said dial plate changing based on a speed of said indicating pointer movement; and visible light radiating means provided on a front surface of said discharge lamp which emits visible light toward a gauge observer.

2. An analog indicator comprising:

a dial plate;

an indicating pointer which is responsive to an input signal and which moves over said dial plate, said indicating pointer having a discharge lamp with ultraviolet radiating means for projecting ultraviolet light having a preselected wavelength;

luminescent means provided on said dial plate, said luminescent means having a fluorescent layer which brightens in response to said ultraviolet light projected from said ultraviolet radiating means; and illuminating control means responsive to said input signal for activating said discharge lamp resulting in emission of said ultraviolet light onto said fluorescent layer, an amount of an afterglow area of said fluorescent layer changing based on a speed of said indicating pointer movement.

3. An analog indicator as set forth in claim 2, wherein said dial plate has first and second marks thereon, said first mark corresponding to a higher level of said input signal, said second mark corresponding to a lower level of said input signal, said discharge lamp being oriented to illuminate an area on said luminescent means between said indicating pointer and said second mark.

4. An analog indicator as set forth in claim 2, wherein said dial plate has first and second marks thereon, said first mark corresponding to a higher level of said input signal, said second mark corresponding to a lower level of said input signal, and wherein said illuminating control means provides a first control signal to said discharge lamp in response to an increase in a level of said input signal so that said discharge lamp projects said ultraviolet light onto an area on said luminescent means which is located between said second mark and said indicating pointer when said indicating pointer moves toward said first mark.

5. An analog indicator as set forth in claim 4, wherein said illuminating control means provides a second control signal to said discharge lamp in response to a decrease in a level of said input signal so that said discharge lamp projects said ultraviolet light onto an area on said luminescent means which is located between said first mark and said indicating pointer when said indicating pointer moves toward said second mark.

6. An analog indicator as set forth in claim 2, wherein said illuminating control means modifies an intensity of said ultraviolet light emitted from said discharge lamp based on a variation rate of said input signal.

7. An analog indicator as set forth in claim 6, wherein said illuminating control means increases said intensity of said ultraviolet light emitted from said discharge lamp based on an increase in said variation rate of said input signal.

8. An analog indicator as set forth in claim 2, wherein said fluorescent layer is formed inside marks provided on said dial plate which respectively represent indicating parameters.

9. A gauge comprising:

an indicating pointer mounted on a pointer shaft, said indicating pointer moving based on an input signal;

a discharge lamp mounted on said indicating pointer and having a first side and a second side;

ultraviolet radiating means being provided on said second side of said discharge lamp for radiating ultraviolet light;

visible light radiating means being provided on said first side of said discharge lamp for emitting visible light toward a gauge observer; and a luminescent layer provided on a dial plate, said luminescent layer being made of a fluorescent substance having afterglow characteristics, the fluorescent substance brightening in response to incidence of said radiated ultraviolet light from said ultraviolet radiating means, an amount of an afterglow area of said luminescent layer on said dial plate changing based on a speed of said indicating pointer movement.

* * * * *